United States Patent [19]

McGann

[11] Patent Number: 4,506,383

[45] Date of Patent: Mar. 19, 1985

[54] METHOD AND APPARATUS FOR RELAYING SIGNALS BETWEEN A GROUND STATION AND A SATELLITE USING A GROUND RELAY STATION

[75] Inventor: William E. McGann, Satellite Beach, Fla.

[73] Assignee: Harris Corporation, Melbourne, Fla.

[21] Appl. No.: 109,505

[22] Filed: Jan. 4, 1980

[51] Int. Cl.$^3$ .................. H04B 7/15; H04B 7/185
[52] U.S. Cl. ............................. 455/17; 455/13; 455/15; 455/21
[58] Field of Search ............... 455/11, 12, 13, 15, 455/16, 17, 20, 22, 49, 59, 7; 370/26, 73, 104; 343/100 ST; 375/3, 4; 179/2 E, 2 EA, 2 EB, 18 EA

[56] References Cited

U.S. PATENT DOCUMENTS

| | | | |
|---|---|---|---|
| 2,874,273 | 2/1959 | Jocobsen | 455/22 |
| 3,225,300 | 12/1965 | Barney | 455/1 |
| 3,369,180 | 2/1968 | Renkowitz | 455/22 |
| 3,452,356 | 6/1969 | Stoney | 343/100 SL |
| 3,678,388 | 7/1972 | Peterson | 455/13 |
| 3,886,452 | 5/1975 | Seidel | 455/22 |
| 4,002,980 | 1/1977 | Herz | 455/16 |
| 4,130,801 | 12/1978 | Prygoff | 370/73 |
| 4,198,600 | 4/1980 | Oguchi | 455/17 |

OTHER PUBLICATIONS

Comstar Satellite System, by G. Abutaleb, et al., Comsat Technical Review, vol. 7, No. 1, Spring 1977, pp. 35-83.
Satellite Spacing and Frequency Sharing for Communication and Broadcast Services, by John L. Hult, et al., Proceedings of the IEEE, vol. 59, No. 2, Feb. 1971, pp. 118-128.
Transmission Delay and Echo Suppression, by Richard G. Gould, et al., IEEE Spectrum, Apr. 1970, vol. 7, No. 4, pp. 47-54.
An Experimental Domestic Satellite Earth Station, by W. Lulofs, Philips Telecommunication Review, vol. 35, No. 3, Sep. 1977, pp. 147-153.
Some Switching, Signalling and Synchronisation Technique in Satellite Communication Systems, by A. Even-Chaim, Telecommunication Journal of Australia, vol 25, No. 3, pp. 239-250, 1975.

Primary Examiner—Tommy P. Chin
Attorney, Agent, or Firm—Antonelli, Terry & Wands

[57] ABSTRACT

In satellite communication systems it is often necessary to relay the signal between terminal stations and the satellite through ground relay stations remote from the terminal stations. Normally, in systems using composite multi-carrier signals for transmission through the satellite, the composite multi-carrier signals are reduced to baseband in the ground relay station prior to retransmission. To reduce the amount of equipment and the cost of such a ground relay station, a method and apparatus for relaying the composite multi-carrier signal through the ground relay station without reducing it to baseband in the ground relay station is provided. Thus, with this arrangement, the composite multi-carrier nature of the signal is preserved throughout the ground relay station.

16 Claims, 3 Drawing Figures

METHOD AND APPARATUS FOR RELAYING SIGNALS BETWEEN A GROUND STATION AND A SATELLITE USING A GROUND RELAY STATION

FIELD OF THE INVENTION

This invention relates generally to communication relay systems, and, more particularly, to methods and apparatus for relaying signals from a terminal station to a satellite through a ground relay station.

BACKGROUND OF THE INVENTION

In recent years, satellite relays have come into common usage in allowing communication between cities separated by large distances. For example, such satellite relays are now used in a large number of cases for the communication of voice, teletypewriter (TTY), and television signals from one city to another. In this process, a terminal station such as a communication switching center (e.g. a telephone central office) is provided in each city. This communication switching center receives signals from and transmits signals to individual subscribers to provide baseband information to the subscribers.

In a simple system for transmitting from a first city to a second city using the well-known single channel per carrier approach (SCPC), the baseband information at the communication switching center is converted to a composite multi-carrier intermediate frequency signal and then to a composite multi-carrier radio frequency signal. A separate carrier is provided for each baseband signal, and these separate carriers are added to produce the composite multi-carrier radio frequency signal. This composite radio frequency signal is transmitted as a satellite up link channel signal typically having a 36 MHz bandwidth portion of the frequency band between 5.9 and 6.4 GHz. Each such up link channel with its 36 MHz bandwidth has between 400 to 800 individual carriers separated by 45 kHz for individual channels having a ±12 kHz bandwidth.

The satellite relay takes this up link multi-carrier signal and converts it to another composite multi-carrier satellite down link signal which also has a 36 MHz bandwidth but with a different frequency band than the up link signal (for example, typically in the frequency band between 3.7 and 4.2 GHz). The down link signal is received at the communication switching center at the second city where it is converted to a composite multi-carrier intermediate frequency signal and subsequently to baseband signals. These baseband signals are then used for transmission to the individual subscribers at the second city. Of course, the systems are generally designed for duplex operation for communication back and forth between the two cities.

Although the basic arrangement described above works well in areas where space is not at a premium, it has a serious drawback in most practical instances. Specifically, a very large antenna, for example often on the order of 8 to 16 meters, or even larger, is necessary for respectively receiving and transmitting the satellite down link and up link signals. Such large antennas, along with all their associated hardware, are often quite objectionable and impractical in cities.

Accordingly, to eliminate the need for such large antenna systems located in a metropolitan area, ground relay stations are generally provided at a location remote from the city. The ground relay station receives the down link satellite signal and transmits the up link satellite signal. The large antenna and hardware necessary for directly handling such satellite signals are located at the ground relay, well outside of the actual metropolitan area. The ground relay serves to relay the information between the satellite and the communication switching center in the city over a microwave relay link. Typically, this microwave relay link is at a frequency different than the respective up link and down link satellite signals. The size of the antenna necessary at the communication switching center to communicate with the ground station is much smaller than that necessary for direct satellite communication.

FIG. 1 provides an overall block diagram view of a satellite relay system for communicating between two distant communication switching centers 10 and 12 using a satellite relay 14 and two ground relays 16 and 18. Both ground relays 16 and 18 are typically located at a distance of several miles from the communication switching centers. As an example of signal transmission, data from the communication switching center 10 is relayed to the other communication switching center 12 through the ground relay 16, the satellite relay 14, and the other ground relay 18.

In prior systems of this type, the ground relay stations 16 and 18 processed the entire received satellite down link signal to recover all of the original baseband signals therefrom. Local information which is needed at the ground relay itself can be stripped off for direct usage in the vicinity of the ground relay. The remaining baseband signals are again processed to form a single composite FDM-FM radio frequency signal for transmission to the communication switching center 10 or 12. This newly produced FDM-FM composite signal normally is different in both frequency band and bandwidth in comparison to the up link and down link signals. Upon receipt of this new FDM-FM signal, the communication switching center 10 or 12 reduces this composite FDM-FM signal to baseband signals for transmission to individual subscribers. The up link operation is the reverse of this down link operation as just described.

Although this ground relay arrangement does allow removal of the direct satellite reception and transmission equipment from metropolitan areas, it also has a number of serious drawbacks. In the first place, because the ground relay reduces the entire down link and up link satellite signals to baseband before conversion to a composite multi-carrier radio frequency signal, a separate receiver is required for each baseband channel. In a typical modern system, up to 800 one-way baseband channels are provided in each satellite channel. Most satellites now provide either 12 or 24 satellite channels. Therefore, the ground relay has to provide up to 800 receiver-transmitter units for conversion of the baseband signals for each satellite channel. Thus, in a 24-satellite channel system, 19,200 receiver-transmitter units are required at the ground relay due to this reduction to baseband arrangement.

In addition to the large number of receiver-transmitter units necessary for baseband processing, the ground relay station also requires equipment for multiplexing the baseband signal and FDM-FM modulation and demodulation equipment for putting the signals into a form suitable for transmission as a composite multi-carrier radio frequency signal. Such equipment can be extremely costly. Although this cost can be justified to some extent in areas where a very high line usage occurs, it has a very low cost effectiveness in situations of low line usage.

Although, as mentioned above, it is sometimes desirable to strip off some signals for use at the ground relay, it is generally not necessary that all of the signals be reduced to baseband. The reason is that these signals are not actually needed in baseband form until they reach the communication switching terminal. In fact, in addition to such reduction of all signals to baseband being unnecessary, it also creates dialing interface problems. Further, it makes voice communication non-secure at the ground relay station because all voice conversations can be listened to at the ground relay station.

SUMMARY OF THE INVENTION

Accordingly, it is an object of the present invention to provide an improved method and apparatus for relaying signals from a terminal ground station to a satellite through a ground relay station.

Further, it is an object of the present invention to provide a method and apparatus for communicating between two terminal stations using at least one satellite relay and at least one ground relay.

With these and other objects in view, the present invention contemplates a method and apparatus for relaying a composite multi-carrier signal between first and second terminal stations through a satellite relay and a ground relay without the composite multi-carrier signal being reduced to baseband signals while it is being relayed. Thus, when a composite radio frequency multi-carrier satellite down link signal is received at the ground relay, it is converted to a second composite radio frequency multi-carrier signal without reducing the satellite down link signal to baseband signals. This second radio frequency signal is then transmitted to the terminal station over a microwave relay link formed between the two stations. Similarly, a composite multi-carrier radio frequency signal from the terminal stations is converted to a composite multi-carrier radio frequency satellite up link signal without any reduction to baseband in the ground relay. Thus, the composite multi-carrier nature of the signal is preserved through the entire relay path of a satellite relay and a ground relay between a pair of terminal stations. The same information bandwidth is used for all signals throughout the entire relaying operation.

BRIEF DESCRIPTION OF THE DRAWINGS

Other objects and advantages of the present invention may be more clearly understood by reference to the following detailed description and drawings wherein.

DETAILED DESCRIPTION OF THE INVENTION

Figure 1:
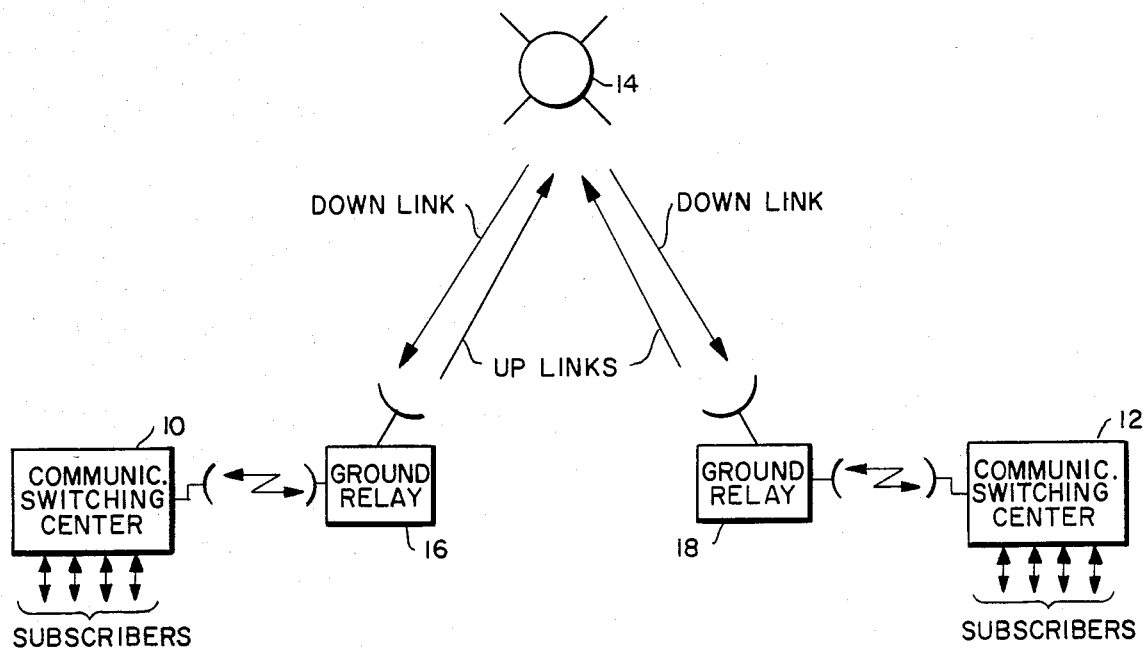
FIG. 1 is an overall view of a satellite system utilizing ground relay stations for relaying signals between two communication switching centers.
Figure 2:
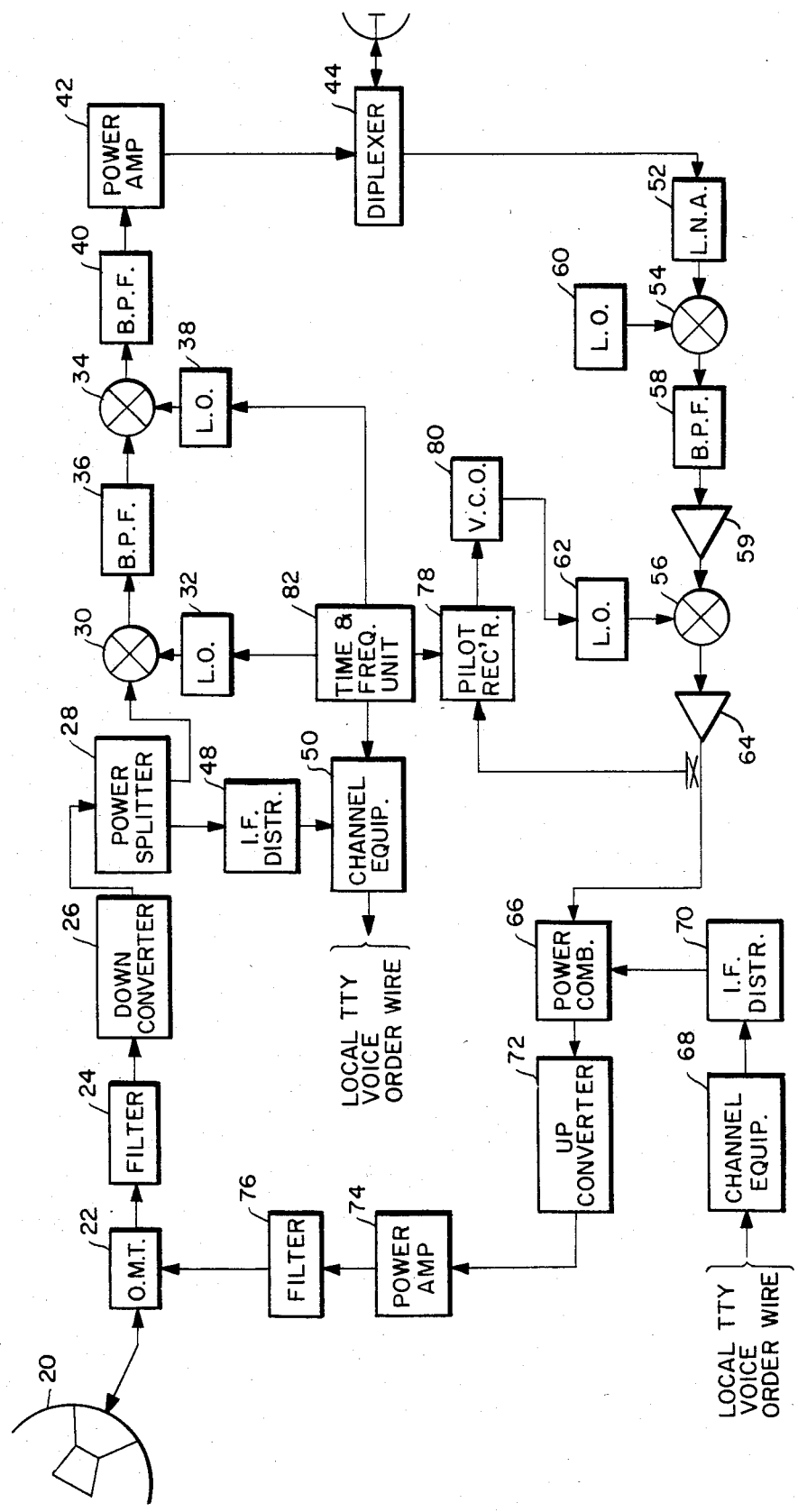
FIG. 2 is a block diagram of a ground relay station according to the present invention.

Referring now to the drawings, and in particular to FIG. 2, a ground relay station is shown which can be used as one of the ground relay stations 16 or 18 shown in FIG. 1. In FIG. 2, a satellite down link signal is received by a larger antenna 20 and passed to an orthomode transducer (OMT) 22. As discussed previously, this satellite down link signal would typically be an SCPC composite multi-carrier radio frequency signal in the range of 3.7 GHz to 4.2 GHz with a bandwidth of 36 MHz.

After reception in the OMT 22, the signal is passed through a filter 24 to a down converter 26. This down converter 26 reduces the composite multi-carrier radio frequency satellite signal to a composite multi-carrier intermediate frequency signal. With present equipment, a convenient multi-carrier IF signal would be a 70 MHz center frequency signal with the same 36 MHz bandwidth as the satellite down link signal. Thus, the center frequencies of the individual channel carriers in the SCPC intermediate frequency signal fall within a range from 52 MHz to 88 MHz. Of course, another intermediate frequency band could be used if desired. Also another bandwidth could be used. However, it has been found that the most straightforward and satisfactory system in accordance with the present invention maintains the same bandwidth in the intermediate frequency stage as in the radio frequency stage.

The output of the down converter 26 is split in a power splitter 28. A first split portion of the intermediate frequency signal is passed to a mixer 30. This mixer 30 steps up the IF frequency to a higher frequency by mixing it with a signal from a local oscillator 32. An example of a suitable frequency output of the mixer 30 would be a 1700 MHz center frequency signal obtained from mixing the 70 MHz IF signal with a 1630 MHz local oscillator signal. The bandwidth of this stepped-up signal will be 36 MHz, so that the frequency range covered by the center frequencies of the individual carriers in this multi-carrier signal would be between 1682 and 1718 MHz.

The 1700 MHz multi-carrier signal at the output of the mixer 30 is passed to a second mixer 34 through a bandpass filter 36. This second mixer steps up the frequency to a suitable frequency for the microwave relay link between the ground relay and the communication switching center. For example, a RF signal could be generated with a 36 MHz bandwidth slot somewhere in the RF frequency band between 7125 MHz and 8500 MHz. This could be accomplished by setting a local oscillator 38 to operate in conjunction with the mixer 34 wherein the local oscillator 38 has a frequency somewhere in the range between 5425 MHz and 6800 MHz depending on the particular center frequency for the RF relay link which is chosen. Of course, the particular frequency band for the microwave relay link depends on the frequency allocations of the country in which the microwave relay link is to be established. The frequencies given herein are solely for purposes of example.

The RF output of the second mixer 34 is passed through a bandpass filter 40 and a power amplifier 42 to a diplexer 44. This diplexer 44 then passes the RF signal through an antenna 46 for transmission across the microwave relay link to the communication switching center.

Another portion of the IF signal stripped by the power splitter 28 is passed through an IF distributer 48 to channel equipment 50. This portion of the IF signal carries information necessary for local purposes at the ground relay station rather than at the communication switching center. This can include, for example, local teletype signals (TTY), local voice signals and order wire information for the local ground relay. The channel equipment 50 will reduce the stripped IF signal to baseband for these purposes. It is important to note, however, that the portion of the IF signal which is ultimately sent across the microwave relay link is at no time reduced to baseband in the ground relay.

Essentially, a reverse operation is performed by the ground relay to convert a composite multi-carrier relay link RF signal received from the communication switching center by the antenna 46 to a composite multi-carrier satellite up link signal transmitted from the antenna 20. Specifically, the composite multi-carrier SCPC relay link RF signal is passed from the antenna 46 through a diplexer 44 and a low noise amplifier 52 to a mixer 54. The output of the mixer 54 is, in turn, passed to another mixer 56 through another bandpass filter 58 and an amplifier 59. The mixer 54 provides a first reduction of the RF signal and the second mixer 56 reduces the signal further to a composite multi-carrier IF signal. Thus, if as discussed above, the microwave relay link signal is a 36 MHz bandwidth signal somewhere in the frequency range between 7125 MHz and 8500 MHz, the first mixer 54 can reduce this to a 36 MHz bandwidth signal having a center frequency of 1700 MHz. The second mixer 56 will reduce this 1700 MHz signal to a 70 MHz IF signal, also with a 36 MHz bandwidth. Local oscillators 60 and 62 cooperate with the mixers 54 and 56 respectively for this conversion. In the frequency range examples given above, the local oscillator 60 will have a frequency between 5425 and 6800 MHz, and the local oscillator 62 will have a frequency of 1630 MHz.

The IF output of the mixer 56 is passed through the amplifier 64 to a power combiner 66. This power combiner 66 adds local information such as TTY, local voice, and order wire to the IF output of the amplifier 64. This local information is converted from baseband to a composite multi-carrier IF signal by channel equipment 68, and is passed to the power combiner 66 through an IF distributor 70. Again, it should be noted that the signals from the communication switching center as received at the antenna 46 are at no time reduced to baseband by the ground relay.

The composite multi-carrier IF signal from the power combiner 66 is converted up to a composite multi-carrier radio frequency signal by up converter 72. For normal satellite up link usage, the frequency range in which this satellite up link signal would lie would be between 5.9 and 6.4 GHz with a bandwidth of 36 MHz. The RF up link signal is amplified by a power amplifier 74 and filtered by a filter 76. It is then passed to the OMT 22 for transmission from the antenna 20.

In order to provide frequency alignment between the communication switching centers 10 and 12 and the respective ground relays 16 and 18, a pilot signal arrangement is utilized. The pilot signal transmitted from the communication switching center is received in the up link portion of the ground relay by a pilot receiver 78 coupled to the output of the IF amplifier 64. This pilot receiver 78 controls a voltage controlled oscillator 80. The output of the voltage controlled oscillator 80 controls the local oscillator 62 to ensure frequency alignment for the mixer 56 which performs reduction of the received signal to a 70 MHz IF signal.

Overall synchronization of the ground relay station is achieved by a time and frequency unit 82. This time and frequency unit 82 ensures the time and frequency control by providing such time and frequency control signals to local oscillators 32 and 38, the pilot receiver 78, and the channel equipment 50.

Figure 3:
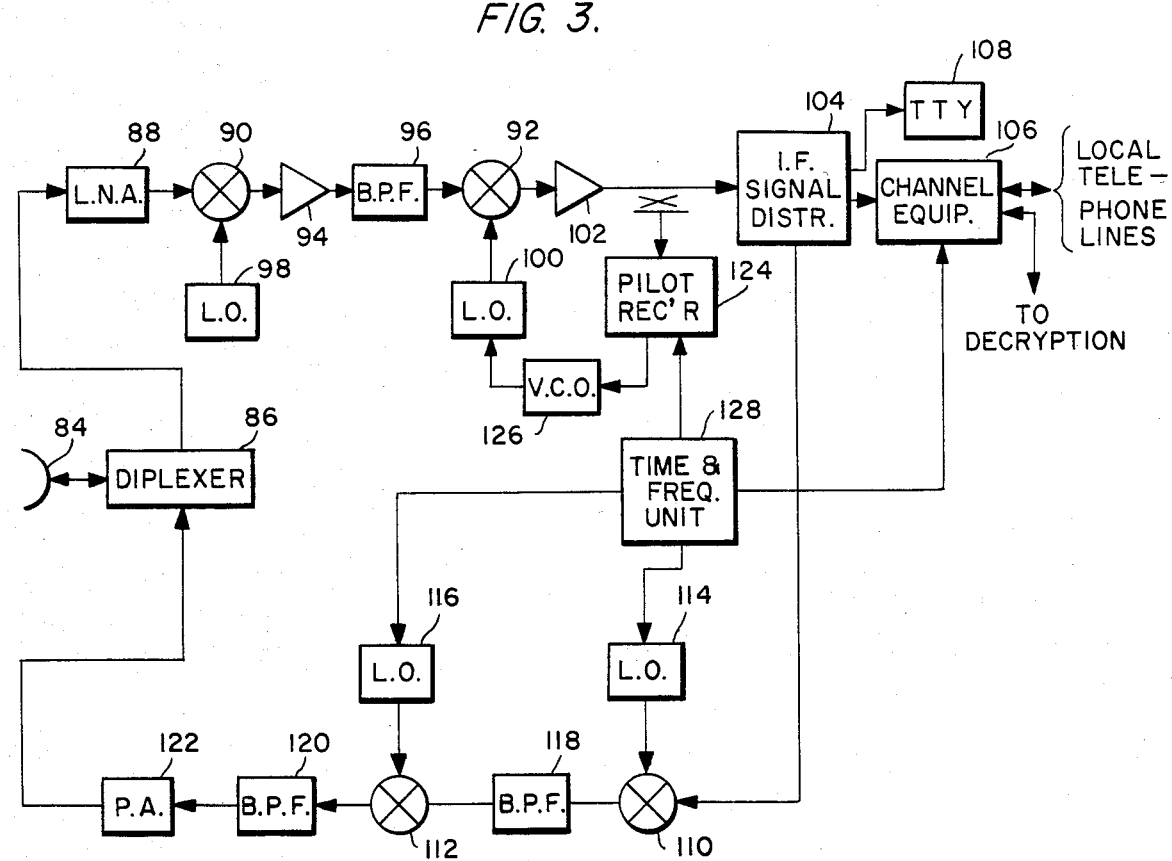
FIG. 3 is a block diagram of a communication switching terminal station for use in the present invention.

FIG. 3 shows a communication switching center for use with the present invention. As is apparent from FIG. 3, the receiving and transmitting equipment at the communication switching center is essentially the same as that of the ground relay station. The major difference is that the communication switching center reduces all received information to baseband, while all transmitted information is derived from baseband signals which are provided to the communication switching center. Thus, the communication switching center requires the necessary frequency demodulation equipment and FM modulators to transfer the baseband information to and from a composite multi-carrier IF and RF signal.

On the receiving side of FIG. 3, the composite multi-carrier radio frequency relay link signal from a ground relay station such as shwn in FIG. 2 is received by an antenna 84. From this antenna 84, the RF signal is passed through a diplexer 86 and a low noise amplifier 88 to a first mixer 90. The mixer 90 and another mixer 92 coupled to the output of the mixer 90 through an amplifier 94 and a bandpass filter 96 serve to reduce the RF relay link signal to a composite multi-carrier IF signal (e.g. at a 70 MHz center frequency after a first reduction to a 1700 MHz center frequency signal), in the same fashion as discussed in regard to the ground relay. Local oscillators 98 and 100 set for example at a frequency between 5425–6800 MHz and at 1630 MHz, respectively, operate in conjunction with these mixers 90 and 92 to perform this frequency conversion. The IF output of the mixer 92 is amplified by an amplifier 102 and then distributed by IF distributor 104 to processing equipment such as a demodulator for reducing the IF signals to baseband. In FIG. 3, channel equipment 106 is shown to allow reduction to voice for telephone service and reduction to baseband signals for the use in decryption equipment. Also shown is a teletypewriter 108. Such equipment for the reduction of an SCPC composite IF signal to usable baseband signal is conventional. As discussed earlier, this includes the necessity for individual transmitters and receivers for each of the actual carrier channels being processed. Of course, other equipment for conversion to subscriber information, including television of FM radio signals, could be provided.

On the transmitting side of the communication switching center shown in FIG. 3, a reverse operation is performed. Specifically, local baseband subscriber information is converted by channel equipment 106 and the TTY 108 into an SCPC composite IF signal. This composite IF signal is passed through the IF signal distributor 104 to mixers 110 and 112 which step it up to a radio frequency (e.g. a 36 MHz bandwidth composite multi-carrier RF signal somewhere in the range between 7125 and 8500 MHz), in a manner as discussed before. Local oscillators 114 and 116 are respective inputs to the mixers 110 and 112 to provide the progressive step-up (e.g. the first local oscillator being set at 1630 MHz and the second local oscillator being set between 5425 and 6800 MHz). Bandpass filters 118 and 120 are provided at the respective mixer outputs. The RF output of the bandpass filter 120 is amplified by a power amplifier 122 and then passed through a diplexer 86 to be transmitted by the antenna 84.

The communication switching center also uses a pilot receiver 125 to receive a pilot signal from the ground relay station to provide frequency alignment between the ground relay station and the communication switching center. This pilot receiver 124 is coupled to the IF output of the amplifier 102 and controls a voltage controlled oscillator 126 to stabilize the local oscillator 100, as discussed previously in regard to the ground relay station. Also, a time and frequency unit 128 is coupled to the local oscillators 114 and 116, the channel equipment 106, and the pilot receiver 124 to stabilize the communication swtiching center operation in the same manner as is done in the ground relay. It is noted that this time and frequency unit 128, as well as the time and frequency unit 82, are conventional timing and frequency control units as normally used in communication equipment of this type.

As can be seen from FIGS. 2 and 3, the present invention provides a simple and effective relay system between a terminal station, such as a communication switching center, and a satellite through a ground relay. The basis for this simplicity and efficiency is the fact that the relayed information is not reduced to baseband in the ground relay. Instead, the composite multi-carrier format of the signal is maintained throughout relaying, including preservation of the same bandwidth. This greatly reduces the amount of equipment necessary in the ground relay relative to the ground relays provided in past systems.

Although this invention has been discussed in terms of providing communication between communication switching centers such as central offices located in cities, of course, it is to be understood that the invention is not so limited. Instead, the present invention could be used to provide communication between any two terminal stations which require the use of a ground relay in addition to a satellite relay. These terminal stations could themselves be located in unpopulated land areas or at sea, for example. Also, the invention is not limited to commercial usage since it could readily find use in military operations.

Also, although the invention has generally been described in terms of its usage for a two-way communication link, the invention is applicable, as well, to one-way communication systems.

Further, although particular frequency ranges and bandwidths have been given for the various signals involved in order to facilitate an understanding of the invention, it is noted that the invention is not limited to any particular frequency band or bandwidth. This includes the satellite up and down link frequency signals, inasmuch as the invention could readily be used with other satellite up link and down link signals.

Also, although a direct relay link connection has been shown between the ground relay and the terminal station, it is to be understood that repeaters could be provided along this microwave relay link. For example, if the distance between the ground relay and the terminal station is greater than 15 miles, such repeaters might be appropriate. The repeaters can be used to amplify the composite carrier signal as required and maintain the composite multi-carrier nature of the signal without reducing the relayed information to baseband.

It is to be understood that the above-described arrangements are simply illustrative of the application of the principles of this invention. Numerous other arrangements may readily be devised by those skilled in the art which embody the principles of the invention and fall within its spirit and scope.

I claim:

1. A ground relay station comprising:
   means to receive a single-channel-per-carrier composite RF multi-carrier satellite down link signal;
   means for converting the satellite down link signal to a composite RF multi-carrier relay link signal, wherein said conversion is done without reducing the RF satellite down link signal to baseband signals; and
   means to transmit the RF relay link signal to a terminal station to form a microwave relay link between the ground relay station and the terminal station,
   wherein the converting means includes means to convert the satellite down link signal to a first composite multi-carrier intermediate frequency signal and means to convert the first intermediate frequency signal to said RF relay link signal, and
   wherein said ground relay station further comprises a power splitter coupled to receive said first composite intermediate frequency signal and split it into second and third composite intermediate frequency signals which each contain all of the carriers in said first composite intermediate frequency signal, and means to convert a group of predetermined carriers of the second composite intermediate frequency signal to baseband signals while the corresponding predetermined carriers of the third composite intermediate frequency signal are converted to said RF relay link signal without being converted to baseband signals.

2. A ground relay station as in claim 1, wherein the RF relay link signal has the same bandwidth as the satellite down link signal.

3. A ground relay station as in claim 1, wherein the RF relay link signal has a different frequency band than said satellite down link signal.

4. A ground relay station as in claim 1 wherein the first intermediate frequency signal, the relay link signal and the satellite down link signal all have the same bandwidth.

5. A ground relay station comprising:
   means to receive a single-channel-per-carrier composite RF multi-carrier relay link signal from a terminal station to form a microwave relay link between the ground relay station and the terminal station;
   means for converting the relay link signal to a composite RF multi-carrier satellite up link signal, wherein said conversion is done without reducing the relay link signal to baseband signals; and
   means to transmit the satellite up link signal to a satellite,
   wherein the converting means includes means to convert the RF relay link signal to a composite multi-carrier intermediate frequency signal and means to convert the composite intermediate frequency signal to said satellite up link signal, and
   wherein said ground relay station further comprises means to add baseband information received at said ground relay station from a source other than said terminal station by converting said baseband information to intermediate frequency signals and adding said intermediate frequency signals to the composite intermediate frequency signal.

6. A ground relay station as in claim 5, wherein the RF relay link signal has the same bandwidth as the satellite up link signal.

7. A ground relay station as in claim 5, wherein the RF relay link signal has a different frequency band than said satellite up link signal.

8. A method of relaying single-channel-per-carrier communication signals between a satellite and a terminal station comprising:
   receiving a composite RF multi-carrier satellite down link signal at a ground relay station;

converting the satellite down link signal at said ground relay station to a composite RF multi-carrier relay link signal without reducing the RF satellite down link signal to baseband signals; and transmitting the RF relay link signal from said ground relay station to said terminal station to form a microwave relay link between the ground relay station and the terminal station, wherein the step of converting the RF satellite down link single includes converting the satellite down link signal to a first composite multi-carrier intermediate frequency signal and converting the first intermediate frequency signal to said RF relay link signal, and wherein said method further comprises splitting said first composite multi-carrier intermediate frequency signal into second and third composite intermediate frequency signals which each contain all of the carriers of the first composite intermediate frequency signal, and converting a group of predetermined carriers of the second composite intermediate frequency signal to baseband signals while converting the corresponding predetermined carrier of the third composite intermediate frequency signal to said RF relay link signal without converting them to baseband signals.

9. A method as in claim 8, wherein the RF relay link signal has the same bandwidth as the satellite down link signal.

10. A method as in claim 8, wherein the RF relay link signal has a different frequency band than said satellite down link signal.

11. A method as in claim 8, wherein the step of converting the RF satellite down link signal includes converting the satellite down link signal to a first composite multi-carrier intermediate frequency signal and converting the first intermediate frequency signal to said RF relay link signal.

12. A method as in claim 11, comprising splitting said first composite multi-carrier intermediate frequency signal into second and third composite intermediate frequency signals which each contain all of the carrier of the first composite intermediate frequency signal, and further comprising converting a group of predetermined carriers of the second composite intermediate frequency signal to baseband signals while converting the corresponding predetermined carrier of the third composite intermediate frequency signal to said RF relay link signal without converting them to baseband signals.

13. A method as in claim 8, wherein the first intermediate frequency signal, the relay link signal, and the satellite down link signal all have the same bandwidth.

14. A method of relaying single-channel-per-carrier communication signals between a satellite and a terminal station comprising:

receiving a composite RF multi-carrier relay link signal at a ground relay station to form a microwave relay link between the ground relay station and the terminal station;

converting the relay link signal at said ground relay station to a composite RF multi-carrier satellite up link signal without reducing the relay link signal to baseband signals; and transmitting the satellite up link signal to a satellite, wherein the step of converting the relay link signal includes converting the relay link signal to a composite multi-carrier intermediate frequency signal and converting the composite intermediate frequency signal to said satellite up link signal, and wherein said method further comprises adding baseband information at said ground relay station by converting baseband information received at the ground relay station from a source other than the terminal station to intermediate frequency signals and adding said intermediate frequency signals into said composite multi-carrier intermediate frequency signal.

15. A method as in claim 14, wherein the RF relay link signal has the same bandwidth as the satellite up link signal.

16. A method as in claim 14, wherein the RF relay link signal has a different frequency band than said satellite up link signal.

* * * * *